United States Patent [19]

York et al.

[11] Patent Number: 4,600,042

[45] Date of Patent: Jul. 15, 1986

[54] OIL DISPENSING AND RECEIVING APPARATUS

[76] Inventors: Troy F. York, 204 S. Ohio St.; Arthur G. Dearing, P.O. Box 82, both of Greenville, Ohio 45331

[21] Appl. No.: 650,239

[22] Filed: Sep. 12, 1984

[51] Int. Cl.⁴ .................. B65B 3/06; F01M 11/04
[52] U.S. Cl. ................................ 141/98; 141/330; 141/386; 184/105.1
[58] Field of Search ................. 141/19, 329, 330, 363, 141/364, 383, 384, 385, 386; 222/81, 83.5, 86, 88; 215/332; 220/86 R, 303; 184/105 R

[56] References Cited

U.S. PATENT DOCUMENTS 3,990,489 11/1976 Ruter .................................... 141/330

*Primary Examiner*—Houston S. Bell
*Attorney, Agent, or Firm*—Biebel, French & Nauman

[57] ABSTRACT

An oil dispensing and receiving apparatus that attaches to the oil inlet of a gas combustion engine to open and transfer oil from quart cans or plastic bottles into the engine crankcase without the use of a funnel or other device, and which remains on the engine and replaces the oil cap. The apparatus is equipped with a hinged lid which may be sealed tightly, vented with an air vent cap or adopted to receive a vacuum line for ventilation of the apparatus. The apparatus is fastened into the oil inlet opening in a gas combustion engine by forcing a tapered wedge up into a tapered housing of the apparatus, expanding the sidewalls thereof outwardly to secure it to the oil inlet opening. The apparatus has a number of bushings of various sizes to fit most inlet openings. It also has a twist lock bushing that will lock into the oil inlet and the apparatus fits inside of the bushing and locks tightly to the inlet by tightening of a bolt that draws the tapered wedge up into the apparatus, expanding its sides. The apparatus is equipped with a cutter blade to pierce and open the cans or bottles, which then allows the oil to drain from the can or plastic bottle into the engine crankcase, and the cutter blade is attached to the apparatus and is held in place by the bolt running through the center of it, that screws into the tapered wedge. This apparatus is adaptable to almost any size or shape oil inlet opening through the use of various sized and shaped bushings and can be used to permanently replace a sealed oil cap, an air vent oil cap, or an oil cap equipped with a vacuum line.

5 Claims, 11 Drawing Figures

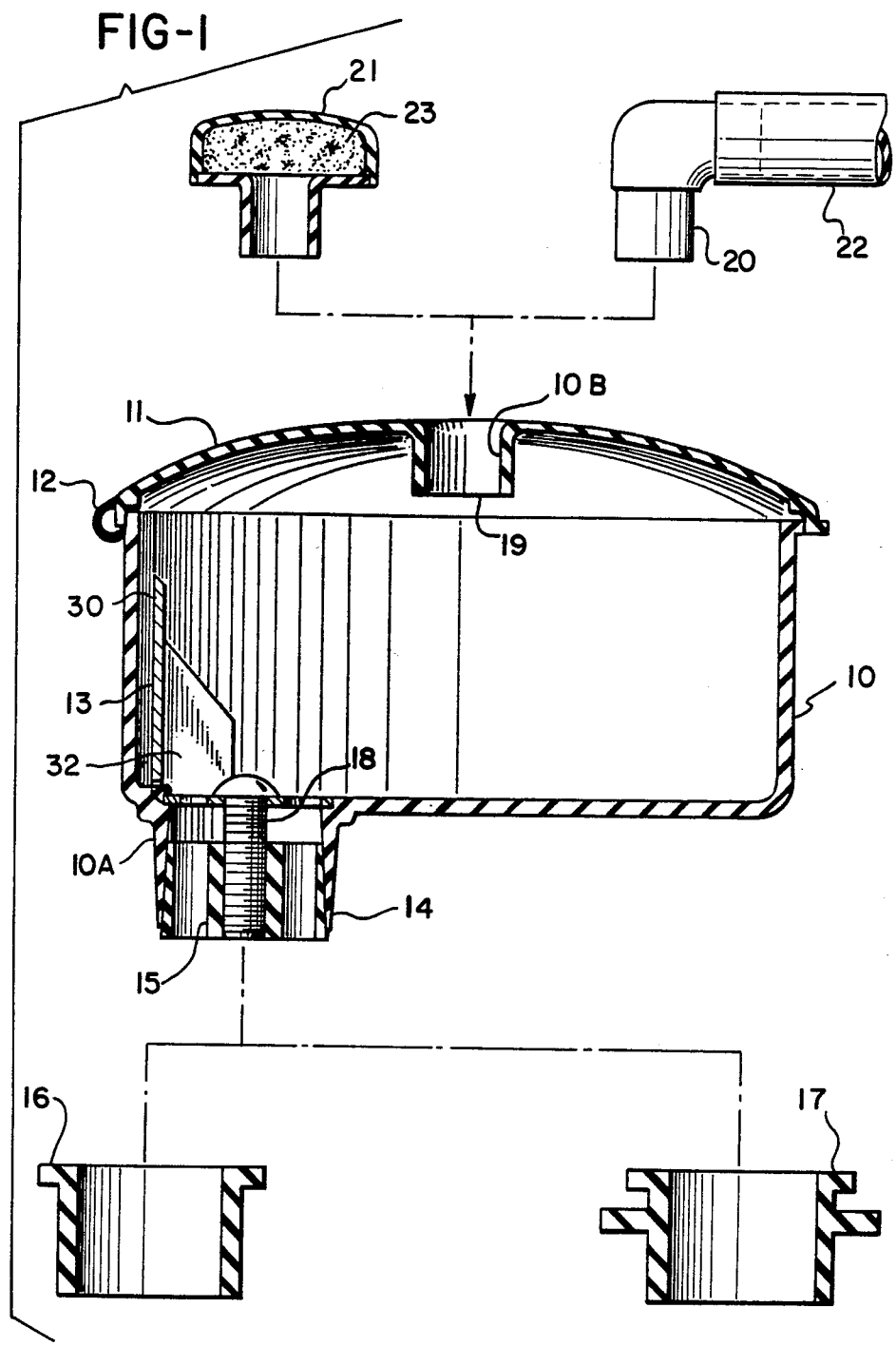

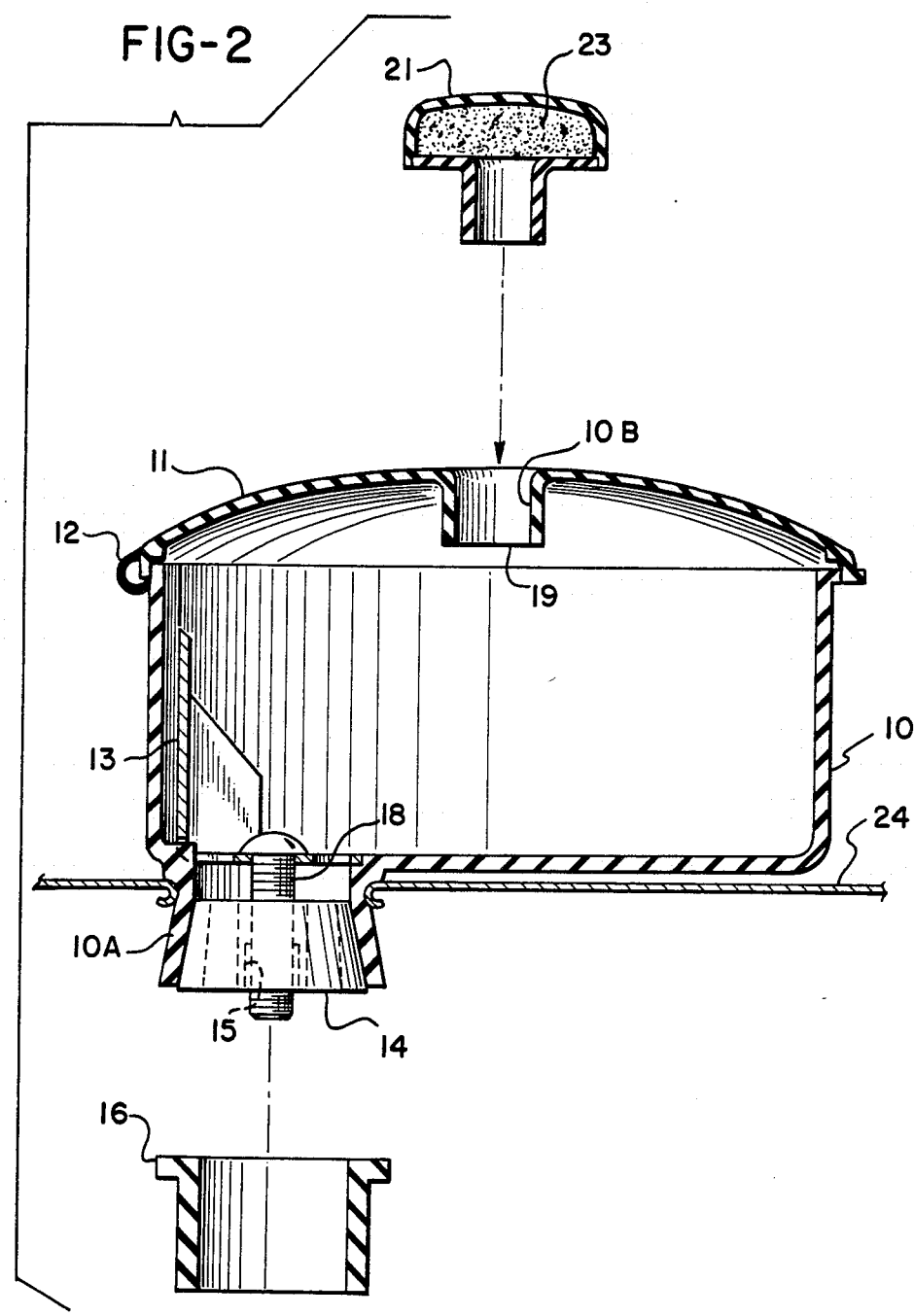

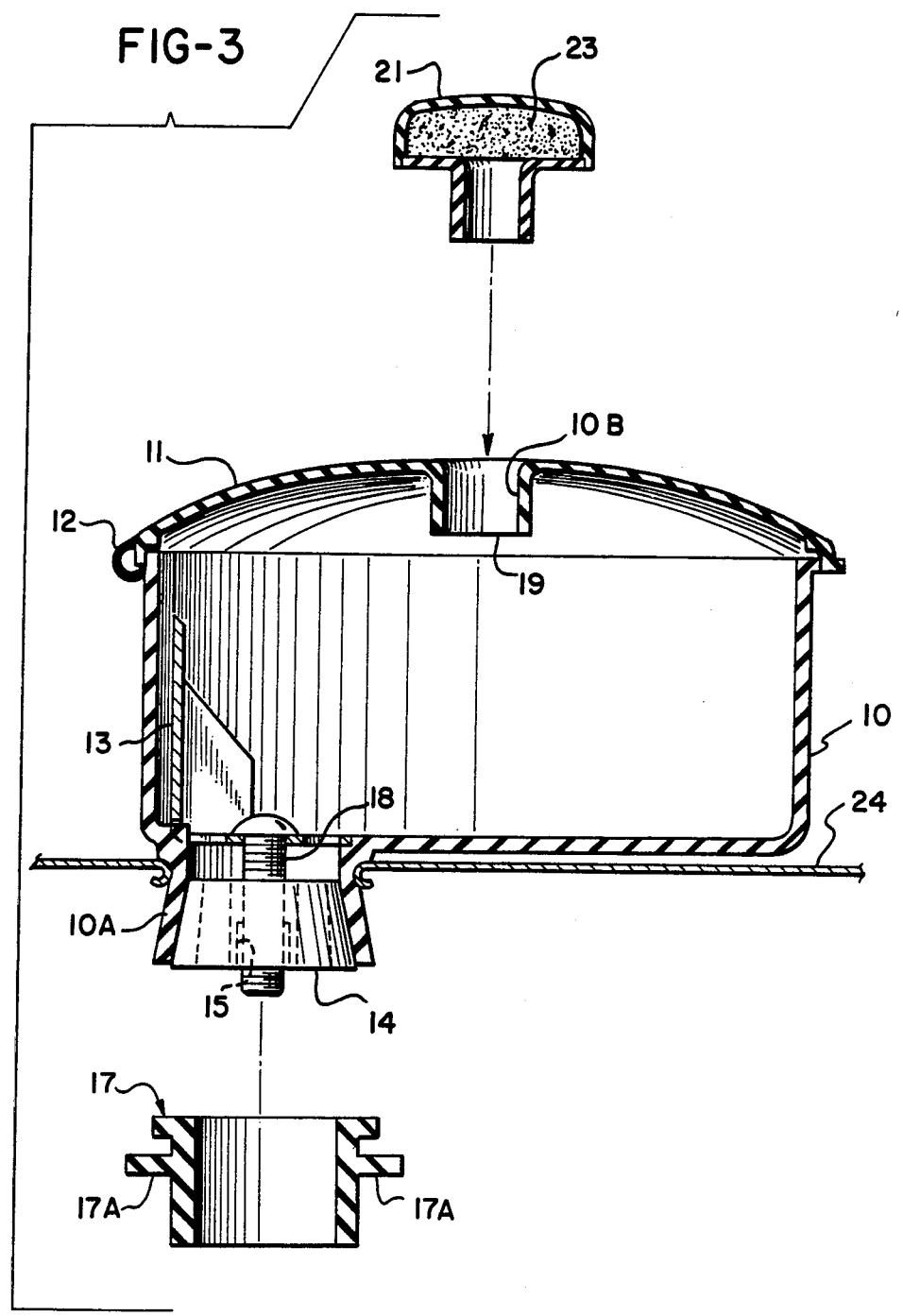

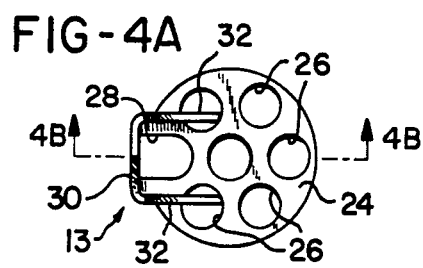
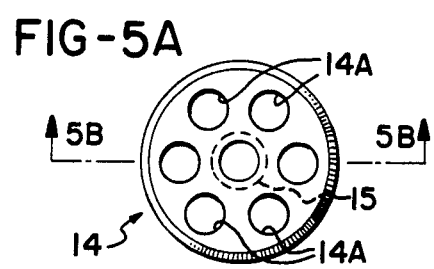
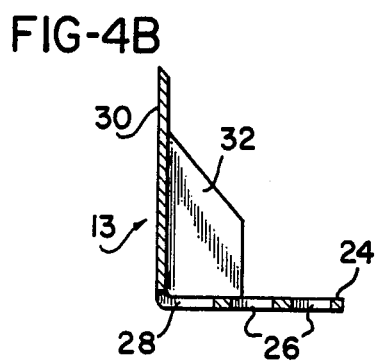
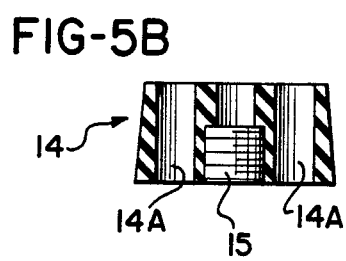
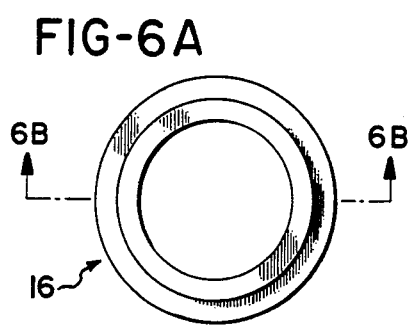
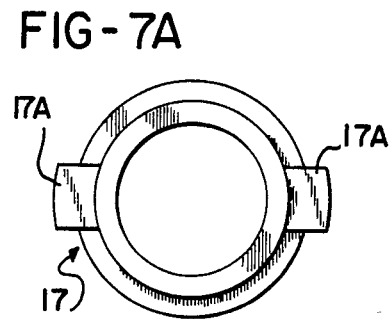
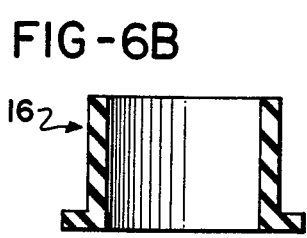
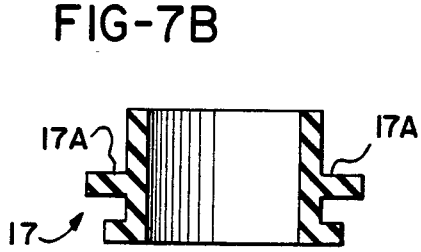

OIL DISPENSING AND RECEIVING APPARATUS

This invention relates to an oil dispensing and receiving apparatus that permanently attaches to the oil inlet opening of a gas combustion engine to transfer oil from quart cans or bottles to the engine crankcase without the use of a funnel or any other device for opening the can or bottle.

BACKGROUND AND SUMMARY OF THE INVENTION

Our invention relates to a new and better way of adding oil to an engine crankcase. For many years in the automobile era, when a person drove into a service station the attendant, while filling the gasoline tank, usually checked the oil and added oil if needed. But, this is more or less a thing of the past. Now most gasoline is sold through self-service filling stations and a big percentage of the oil market is in quart cans and plastic bottles sold through discount stores and supermarkets. A large number of people not only change the oil in their automobile, but they add oil between changes. At present, to add oil to the crankcase of an engine, it is necessary to use an oil spout or a funnel of some sort. Then there must be some method of opening the can. Some oil spouts are equipped with a cutter blade and some cans are opened with a screwdriver. In most cases an unskilled person spills a considerable amount of the oil before getting it started into the oil inlet. Even if a person is fortunate enough to get the oil into the oil inlet, there is still a dirty, dripping funnel or oil spout to contend with. Between uses of the funnel or oil spout, grit and grime collect on the sticky, oily funnel or spout and it must be cleaned thoroughly before reusing as this dirt and grit getting into the crankcase will act as a lapping compound and grind away the moving parts of the engine.

Our invention relates to a steel or plastic housing with a cutter blade attached thereto to puncture the can or bottle, and it is designed to fit into the oil inlet opening of most engines and it clamps thereto permanently by the tightening of one bolt. The apparatus has a self-attached lid which seals the unit, and has means in the lid to fasten a suction hose from the intake manifold which many automobiles are equipped with, or it has a breather cap so that no pressure will build up in the crankcase.

To install our dispensing apparatus to the engine, remove the present oil cap, select the proper bushing to fit the oil inlet opening, insert the dispensing apparatus into the inlet, then tighten the bolt which expands the side of the dispensing apparatus holding it firmly in place. To add oil to the engine, simply raise the lid of the apparatus, place an unopened can or plastic bottle of oil into the apparatus, push down to pierce the can or bottle and let the oil drain into the engine. Remove the can or bottle and close the lid. There is no dripping, nor can dirt get into the engine. The apparatus can also be used as a funnel to receive oil from other sized containers.

In the center of the lid a tapered hole is provided, which is sealed with a knock-out. There is a compression type hose fitting and a compression type vent cap, either of which will fit into the center hole when the knock-out is removed. If the oil cap on the engine, which is being replaced with this apparatus is air tight, then the knock-out is left in the hole and the air filter and hose fitting are discarded. If the engine is equipped with a vacuum line attached to the original oil cap, then the hose fitting would be used and the knock-out would be removed, and the breather cap would be disposed of. If the oil cap also serves as a breather cap, then the knock-out is removed and the breather cap is used and the hose fitting for the vacuum line is disposed of.

DESCRIPTION OF THE DRAWINGS

FIG. 1 is a sectioned side view of the oil dispensing and receiving apparatus, embodying the invention.

FIG. 2 shows the apparatus attached to the oil inlet opening of a gas combustion engine and a bushing for larger sized oil inlet openings.

FIG. 3 shows the apparatus attached to the oil inlet opening of a gas combustion engine and a bushing for twist lock type openings.

FIGS. 4A and 4B shows the cutter blade for opening the cans and bottles.

FIGS. 5A and 5B shows the tapered wedge to expand the sidewall of the apparatus.

FIGS. 6A and 6B show a typical the bushing for adopting the apparatus for various size openings.

FIGS. 7A and 7B shows a twist lock type bushing.

DESCRIPTION

Our invention consists of a steel or plastic tubular housing 10 with a hinged lid 11 which seals the unit from any dust or dirt entering the engine. The lid 11 has a live hinge 12 and the housing 10 is equipped with a cutter blade 13 (see FIGS. 4A and 4B) for the opening of cans or bottles. A tapered wedge 14 (see FIGS. 5A and 5B) is mounted in a generally cylindrical oil outlet 10A of the housing 10 and it is held in the proper position by a bolt 18 which goes through the cutter blade 13 and screws into a threaded insert 15 mounted in the tapered wedge 14. When the bolt 18 is tightened, it forces the tapered wedge 14 further up into the tapered oil outlet 10A of the housing 10 expanding the walls thereof tightly against the oil inlet opening 24 and holding the apparatus permanently on the engine. Oil inlet openings 24 vary somewhat in size and method in which the original oil cap is locked onto the inlet. For larger inlet openings, a bushing 16 (see FIGS. 6A and 6B) is slipped over the outside bottom of the oil outlet 10A of housing 10. If the engine is equipped with a twist type locking device, a bushing 17 (see FIGS. 7A and 7B) is locked into the oil inlet opening 24 and the oil outlet 10A of the housing 10 is inserted into the bushing 17 which expands the sidewall and locks it permanently into position.

The lid 11 has a tapered hole 10B in its center which is sealed with a knock-out to accommodate engines that require an air vent cap 21 or a vacuum hose 22. If an air vent is required, the knock-out 19 is removed and the air vent cap 21, which is equipped with an air filter 23, is inserted in the center hole of the lid 11. If the engine is equipped with a vacuum line, the knock-out 19 is removed and a hose fitting 20 is placed into the lid 11 and the vacuum hose 22 is attached to the hose fitting 20.

As best shown in FIGS. 4A and 4B, the cutter blade 13 comprises a generally circular supporting base 24 having openings 26 therethrough, with one of the openings 26 being centered on the generally circular supporting base 24. A notch 28 is formed into the side of the supporting base 24 to keep the cutter blade 13 from rotating when the bolt 18 is turned. An upstanding cutter blade 30 extends at approximately 90° from the supporting base 24, as best shown in FIG. 4B. Extending perpendicular to the cutter blade 30 are vertical deflecting members 32 which serve to extend the opening cut into an oil can or bottle by the cutter blade 30 and thereby facilite opening and transfer of oil from the container into the engine.

While it is apparent that the central opening 26 through the supporting base 24 is blocked by the bolt 18, the surrounding openings 26, as well as a portion of the notch 28, permit the oil to pass therethrough and serve as a coarse filter for oil being passed through the apparatus of the present invention. The oil continues through the oil outlet 10A by being transmitted through oil passages 14A in the tapered wedge 14, as best seen in FIGS. 5A and 5B.

FIGS. 6A-7B show bushings 16 and 17 which can be provided to permit the oil outlet 10A to be fitted into variously sized oil inlet openings 24. While the bushing 16 is generally illustrative of bushings which may be utilized to adapt the apparatus of the present invention to straight line oil inlet openings 24, the bushing 17 of FIGS. 7A and 7B defines tabs 17A such that the bushing 17 can be inserted and twisted to temporarily engage the bushing with a twist-to-lock oil inlet prior to permanently retaining the apparatus of the present invention within the bushing 17 by means of the tapered wedge 14 as previously described.

Although the preferred embodiment of the apparatus has been described, it will be understood that within the purview of this invention various changes may be made in the form, details, proportion and arrangement of parts, the combination thereof and mode of operation, which generally stated consist in an apparatus capable of carrying out the objects set forth, as disclosed and defined in the appended claims.

Having thus described our invention, we claim:

1. An oil dispensing and receiving apparatus for use on a gas combustion engine comprising:
   a tubular housing having generally cylindrical sidewalls and a flat bottom wall, said tubular housing being sized to receive a standard sized quart oil container;
   lid means for selectively closing said tubular housing;
   a generally cylindrical oil outlet integrally formed into and extendng from the bottom wall of said tubular housing, said oil outlet being sized to be received within an oil inlet of said engine;
   tapered wedge means defining oil passages therethrough and sized to be received within and drawn into said oil outlet after it has been inserted into said oil inlet to thereby permanently retain said oil dispensing and receiving apparatus on said engine; and
   blade means secured to said bottom wall of said tubular housing for opening an oil container inserted into said tubular housing whereby oil from the opened container can pass into said engine through said oil outlet, said tapered wedge means and said oil inlet.

2. An oil dispensing and receiving apparatus as claimed in claim 1 wherein said tapered wedge means includes a threaded central insert and said blade means comprises a supporting base having openings therethrough with an upstanding cutter blade extending at approximately 90° from said base, said blade means and said wedge means cooperating to assemble said apparatus and to permanently retain said apparatus on said engine by means of a screw passing through one of said openings of said base and threadingly engaging said insert to draw said wedge means into said oil outlet and thereby secure said base to said flat bottom wall over said oil outlet.

3. An oil dispensing and receiving apparatus as claimed in claim 2 wherein said tubular housing and said lid means are formed as an integral unit of a plastic material with a thin section of said plastic material bridging said tubular housing and said lid means to form a live hinge therebetween, said lid means comprising a domed lid which seals said tubular housing through a snap-on engagement therewith and defines a central aperture sized to receive a vent cap or a hose fitting and being sealed at its distal end by a knock-out whereby said apparatus can be operated in a sealed condition, may be vented to the atmosphere or may be connected to a vacuum line by removal of said knock-out and connection of said vent cap or hose fitting, respectively.

4. An oil dispensing and receiving apparatus as claimed in claim 3 further comprising at least one bushing sized to receive said oil outlet and to be received within said oil inlet whereby said apparatus can be adapted to be received within variously sized oil inlets by means of said bushing.

5. An oil dispensing and receiving apparatus as claimed in claim 4 wherein said bushing defines tabs whereby said bushing can be inserted into a twist lock oil inlet and twisted to temporarily engage the bushing with said oil inlet prior to permanent retention of said apparatus by means of said tapered wedge means.

* * * * *